3,153,020
POLYMERIC SULFONAMIDES
John M. Butler and Lee A. Miller, Dayton, and George L. Wesp, Englewood, Ohio, assignors to Monsanto Company, a corporation of Delaware
No Drawing. Filed Sept. 9, 1960, Ser. No. 54,812
17 Claims. (Cl. 260—79.3)

This invention relates to synthetic resins and more particularly provides high-molecular weight polymers containing a plurality of olefinic double bonds and ester and sulfonamide linkages, which resins are useful in the plastics, coatings and laminate industries. The invention also provides a method of preparing the new polysulfonamide-polyesters by the addition polymerization of acetylenic diesters and certain disulfonamides.

In the copending application Serial No. 38,113 filed June 23, 1960, of Lee A. Miller and John M. Butler, there are disclosed and claimed the diesters of certain diols and certain acetylenic acids, i.e., compounds of the formula

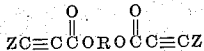

in which Z is selected from the class consisting of hydrogen, alkyl radicals of from 1 to 5 carbon atoms and aryl radicals of 6 to 10 carbon atoms and R is selected from the class consisting of bivalent hydrocarbon radicals and bivalent halohydrocarbon radicals of from 2 to 18 carbon atoms and is linked through diverse carbon atoms thereof to the remainder of the molecule of which it forms a part. Now we have found that said diesters are eminently suited to the manufacture of high molecular weight, polymeric materials by an addition reaction thereof with a compound of the formula

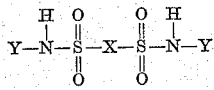

where Y is an alkyl radical of from 1 to 5 carbon atoms and X is selected from the class consisting of hydrocarbylene, hydrocarbyleneoxyhydrocarbylene and hydrocarbyleneoxyhydrocarbyleneoxyhydrocarbylene radicals which are free of aliphatic unsaturation and which contain from 6 to 18 carbon atoms and which is linked through aromatic carbon atoms thereof to the remainder of the molecule. Compounds of this formula may be N,N'-dialkylsulfonamides wherein the two sulfonamide radicals are attached through the sulfur atoms thereof to two aromatic carbon atoms of an -arylene-, aryleneoxyarylene-, -arylenealkylenearylene, arylenealkyleneoxyalkylenearylene, or an aryleneoxyalkyleneoxyarylene radical or such a radical in which one or more of the aromatic rings has attached to it one or more alkyl and/or cycloalkyl radicals. Hereinafter, for the sake of convenience, they will be referred to simply as disulfonamides.

Reaction of the disulfonamides to give the presently provided polymers proceeds by addition of a sulfonamido group across an acetylenic bond of the diester, thus:

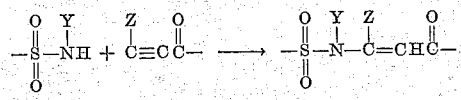

The addition occurs rapidly; so that, while there may be postulated an intermediately formed 2:1 sulfonamide-diester addition product:

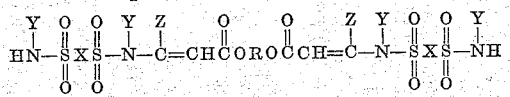

by addition of one mole of the disulfonamide at each of the two acetylenic double bonds of the diester, in practice there occurs a chain-forming reaction whereby there is obtained a resinous polyester-polysulfonamide by repeated addition of the intermediately formed, lower molecular product with either the disulfonamide or the diester, depending upon the nature of the terminal radicals present. Thus addition of the 2:1 disulfonamide-diester adduct shown above with two moles of diester yields

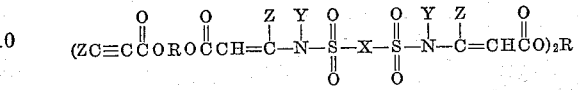

To the terminal acetylenic bonds of such a 2:3 disulfonamide-diester adduct there are then added two moles of the disulfonamide to give

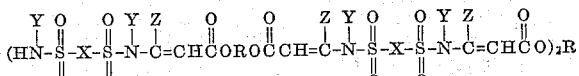

Repeated, alternating addition of monomeric diester at the terminal sulfonamido groups of an intermediately formed adduct and of monomeric sulfonamide across the acetylenic bond of the terminal ester groups of the consequently formed adduct leads to the formation of macromolecules having the repeating unit

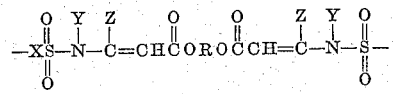

Owing to the addition mechanism, the polymers are readily obtained in a high state of purity. As will be noted, the repeating unit is the addition product of one mole of the diester ZC≡CC(O)ORO(O)CC≡CZ and one mole of the disulfonamide YHNO$_2$SXSO$_2$NHY. Hence when the two reactants are employed in equimolar proportions and the reaction is carried to completion, there is obtained as product a high molecular weight polymer which is free not only of unreacted material but also of by-product. In prior art methods of preparing polyesters and/or polysulfonamides, reaction generally proceeded by a condensation mechanism whereby, in the case of, say, a free dicarboxylic acid and a glycol there was produced water as a by-product or, as in the case of a dialkyl dicarboxylate and a glycol, there was produced an alkanol as by-product. Since the by-products were formed as the condensation polymerization reaction proceeded, the by-products were often occluded in the polymer to the extent that tedious purification was required in order to obtain satisfactory polymer product. Employing the present addition polymerization, of course, there is no need of this.

Acetylenic diesters which are suitable for use in the present process are esters of dihydroxy compounds of the formula OH—R—OH where R is selected from the class consisting of bivalent hydrocarbon radicals and bivalent halohydrocarbon radicals of from 2 to 18 carbon atoms and is linked through diverse carbon atoms thereof to the two hydroxy groups, and of acetylenic dicarboxylic acids of the formula ZC≡CCOOH where Z is selected from the class consisting of hydrogen, alkyl radicals of from 1 to 5 carbon atoms and aryl radicals of 6 to 10 carbon atoms. As disclosed in the copending application of Miller and Butler referred to above, the diesters are prepared by esterification of the dihydroxy compound with either the free acetylenic acid or the acyl halide or anhydride thereof. Use of temperatures below 120° C. and operation in the presence of a diluent are recommended.

The dihydroxy compounds which are used for the preparation of the diesters that are employed in the present invention may be aliphatic, cycloaliphatic, aromatic, or aliphatic-aromatic, and they may be saturated or unsaturated. Thus, as examples of dihydroxy compounds which give acetylenic diesters of present utility are the aliphatic diols, e.g., ethylene glycol,
1,2- or 1,3-propanediol,
1,2-, 1,3-, 1,4-, or 2,3-butanediol,
1,3-, 1,4-, 1,5-, 2,3-, or 2,4-pentanediol,
3-butene-1,2-diol,
2-butene-1,4-diol,
2-bromo-1,3-propanediol,
2-fluoro-1,3-propanediol,
2-butyne-1,4-diol,
2-methyl-1,5-pentanediol,
1,4-dichloro-2,3-butanediol,
2,3-dibromo-1,4-butanediol,
2- or 4-chloro-1,3-butanediol,
2,4-dimethyl-2,4-pentanediol,
1,1,1-trifluoro-2,3-butanediol,
2,2-diethyl-1,4-butanediol
2-pentyn-1,4-diol
2-pentene-1,5-diol,
2-propyl-1,3-butanediol,
2-chloro-1,5-pentanediol,
5-iodo-1,4-hexanediol,
1,4-hexanediol,
5-methyl-1,2-hexanediol,
2-ethyl-1,3-hexanediol,
2-tert-butyl-3,3,4,4-tetramethyl-1,2-pentanediol,
4-methyl-1,4-hexanediol,
1,6-hexanediol,
3,3-dimethyl-1,6-hexanediol,
2,4-dimethyl-2-hexene-2,5-diol,
2,3-, 2,4-, 2,5-, or 3,4-hexanediol,
1-chloro-2,5-dimethyl-3-hexyne-2,5-diol,
2,4-hexadiyne-1,6-diol,
1,6-, 1,7-, 2,4- or 2,5-heptenediol,
2-heptene-1,6-diol,
1-chloro-2,5-dimethyl-3-heptyne-2,5-diol,
4-ethyl-3-methyl-2,4-heptanediol,
1,2-, 1,3-, 1,4-, 1,8-, 2,4-, 2,7-, or 4,5-octanediol,
2-methyl-2-octene-1,4-diol,
2,4,4,5,5,7-hexamethyl-3,6-octanediol,
2,7-dimethyl-4-octane-2,7-diol,
2-butyl-4-ethyl-3-methyl-1,3-octanediol,
(3-heptafluoropropyl)-1,5-pentanediol,
1,9-nonanediol,
1,2-, or 1,10-decanediol,
1,2- or 1,12-dodecanediol,
5-decyne-4,7-diol,
5,9-dimethyl-8-decene-1,5-diol,
5,8-diethyl-6,7-dodecanediol,
9-octadecene-1,12-diol,
9,10- or 1,12-octadecanediol,
1,9- or 1,11-undecanediol,
1,13-tridecanediol,
1,2-tetradecanediol,
1,2- or 1,6-hexanediol,
16-methyl-1,2-heptadecanediol,
1,2- or 1,12-octadecanediol,
2-methyl-1,2-propanediol,
2-butyl-2-ethyl-1,3-propanediol,
2,2-diethyl-1,3-propanediol,
propanediol,
2-isobutyl-1,3-propanediol,
2-ethyl-1,3-butanediol,
2,2-diethyl-1,4-butanediol,
2,2,3,3-tetramethyl-1,4-butanediol, etc.

Examples of the benzenoid diols which are useful for esterification with the acetylenic acid, halide or anhydride to give presently useful diesters are o, m, or p-xylene-α,α'-diols,
3,6-dimethyl-o-xylene-α,α'-diol,
α,α'-dimethyl-p-xylene-α,α'-diol,
1,6-diphenyl-1,6-hexanediol,
1,2-dephenyl-1-2-ethanediol,
1- or 2-phenyl-1,2-propanediol,
2-methyl-1-phenyl-1,2-propanediol,
2-di-o-tolymethyl-1,3-propanediol,
2-methyl-3-phenyl-1,2-butanediol,
1,4- or 2,2-diphenyl-1,4-butanediol,
2,3-dimethyl-1,4-diphenyl-1,4-butanediol,
1,6- or 1,8-naphthalenedimethanol,
α-, α³-mesitylenediol,
o-benzenediethanol,
α,α'-dimethylhydrobenzoin,
2,3-dibenzylidene-1,4-butanediol,
1,1-bis(p-bromophenyl)-2-butyne-1,4-diol,
1-phenyl-1,5-pentanediol,
hydroquinone,
resorcinol,
2,6-dichlororesorcinol,
pyrocatechol,
4-tert-butyl-5-chloropyrocatechol,
4-dodecylpyrocatechol,
p,p'-biphenol,
4,4'-dichloro-o,o'-biphenol,
2,2',6,6'-tetraisopropyl-p,p'-biphenol,
1,8- or 1,2-naphthalenediol,
2-bromo-3-methyl-1,4-naphthalenediol,
4,4''-p-terphenyldiol, etc.

Alicyclic diols useful for the preparation of the presently employed acetylenic diesters are, for example, cyclohexyl-1,2-ethanediol,
1-cyclohexyl-2-methyl-1-phenyl-1,3-propanediol,
5-cyclohexyl-2-methyl-2,3-pentanediol,
1,2-, 1,3- or 1,4-cyclohexanediol,
4-cyclopentyl-1,2-cyclohexanediol,
1,2-dimethyl-1,2-cyclohexanediol,
1,1-cyclopropanedimethanol,
1,2,2,3,5,5-hexamethyl-1,3-cyclohexanediol,
2-cyclohexyl-1,4-cyclohexanediol,
p,p'-bicyclohexanol,
1,1- or 1,2-cyclopentanedimethanol,
3,4-dichloro-1,2-cyclopentanediol,
3-cyclopentene-1,2-diol,
1,2-dimethyl-1,2-cyclopentanediol,
decahydro-2,7-naphthalenediol,
decahydro-2,3-naphthalenedimethanol,
(bicyclohexyl)-1,1'-dimethanol,
4-cyclohexylresorcinol,
3,6-dibromo-4-cyclohexene-1,2-diol,
4,5-dimethyl-4-cyclohexene-1,2-dimethanol, etc.

The acetylenic acids which are reacted with the polyols to give the presently useful acetylenic diesters may be 1-alkynoic acids of from 3 to 8 carbon atoms or arylpropiolic acids of from 9 to 13 carbon atoms. Acyl halides or anhydrides of such acetylenic acids may be used instead of the acids. The following are some examples of acetylenic acid acid compounds which are reacted with the above described diols to give esters of use in the present invention: propiolic acid, propiolyl chloride, bromide, iodide or fluoride, propiolic anhydride, tetrolic acid, 2-pentynoic acid, 1-hexynoic acid, 2-heptynoic acid, 2-octynoic acid, 2-octaynoyl chloride, trimethyltetrolic acid, phenylpropiolic acid, phenylpropiolyl chloride, 2,3,4,6-tetramethylphenylpropiolic acid, o-, m- or p-tolylpropiolic acid, 1-naphthalenepropiolic acid, p-phenylphenylpropiolic acid, etc.

The propiolyl halide which may be used as one of the reactants of the esterification reaction may be prepared by reacting propiolic acid with benzoyl halide, as disclosed in the copending application of Lee A. Miller, Serial No. 6,344, filed February 3, 1960. The propiolyl chloride so formed may be led directly, without intermediate recovery, into a solution or suspension of the diol which is to be esterified for preparation of the presently employed acetylenic diesters.

Some examples of the acetylenic diesters which are useful for the preparation of the presently provided high molecular weight polymers are given below:

3-butene-1,4-diol dipropiolate
Ethylene glycol ditetrolate
2,3-dimethyl-1,3-pentanediol di-2-pentynoate
Propylene glycol dipropiolate
2-methyl-1,5-pentanediol bis(phenylpropiolate)
2-heptene-1,6-diol dipropiolate
1,6-methyl-1,2-heptadecanediol 2-pentynoate
Hydroquinone dipropiolate
o-Benzenediethanol bis(phenylpropiolate)
1-phenyl-1,2-propanediol dipropiolate
4,4'-dichloro-o,o'-biphenol dipropiolate
Dicyclo-4,4'-hexanol dipropiolate
1,2-cyclopentanediol bis(phenylpropiolate)
4-cyclohexene-1,2-dimethanol di-2-pentynoate
1,1-cyclopropanedimethanol dipropiolate
Cyclohexane-1,2-ethanediol bis(phenylpropiolate)
3-cyclopentene-1,2-diol bis(1-naphthalenepropiolate)
Decahydro-2,3-naphthalenedimethanol dipropiolate
2-methyl-1,2-propanediol dipropiolate
2-methyl-2-octene-1,4-diol dipropiolate
1,6-hexanediol bis(4-tolylpropiolate)

The disulfonamides which are used with the above described acetylenic diesters to give the presently provided polysulfonamide-polyesters have the formula YHNO₂SXSO₂NHY where Y is an alkyl radical of from 1 to 5 carbon atoms and X is selected from the class consisting of hydrocarbylene and hydrocarbyleneoxyhydrocarbylene radicals of from 6 to 18 carbon atoms which are free of aliphatic unsaturation and which is linked through an aromatic carbon atom thereof to the remainder of the molecule.

A wide variety of N,N'-dialkyl disulfonamides is presently useful, the restrictions on the compound which is employed for addition to the dipropiolate being simply that the two sulfonamide radicals be attached to an aromatic carbon, that the compound be free of aliphatic unsaturation, and that it contain from 6 to 18 carbon atoms, in addition to those present in the N,N'-dialkyl radicals. The following are typical classes of the disulfonamides which may be used:

(I)

where T is as above defined and $x$ is a number of from cycloalkyl radicals, and $n$ is a number of 0 to 4.

(II)

where T is as above defined and $x$ is a number of from 0 to 8, and $y$ is 0 or 1.

(III)

wherein A is an alkylene radical of from 1 to 6 carbon atoms.

(IV)

(V)

where A is an alkylene radical of from 1 to 6 carbon atoms.

(VI)

where A' is an alkylene radical of from 1 to 3 carbon atoms.

The class (I) includes the benzene disulfonamides and their nuclearly alkylated or cycloalkylated derivatives. Class (II) includes the biphenyl- and terphenyldisulfonamides; class (III) includes the diphenylalkane ar-disulfonamides; class (IV) includes the oxybis(benzenesulfonamides); class (V) includes the alkylenedioxybis(benzenesulfonamides); and class (VI) includes the oxybis(alkylenebenzenesulfonamides).

For convenience, the aromatic rings to which the sulfonamide groups are attached have been depicted above to be benzene rings uniformly. However, the aromatic hydrocarbon ring may be, say, naphthalene, indene, fluorene, or acenaphthene, and one of such rings may be present exclusively in the compound as the aromatic radical or radicals or it may be present in combination with another one of the aromatic radicals, including benzene. As above stated, the aromatic ring to which the sulfonamide radical is attached may also carry one or more alkyl or cycloalkyl radicals.

Examples of presently useful disulfonamides of class (I) are N,N'-dimethyl-o-(or m or p)benzenedisulfonamide; N,N'-diethyl or N,N'-dimethyltoluene-2,3- (or 2,4-, or 2,5-, or 2,6-, or 3,4- or 3,5-)disulfonamide; N,N'-diethyl or N,N'-dibutyl-m-xylene-2,4-disulfonamide, N,N'-dimethyl or N,N'-diamylmesitylene-2,4-disulfonamide; N,N'-diethyl- or N,N'-diisopropyldurenedisulfonamide; N,N'-dimethyl or N-ethyl-N'-methyl-p-cymene-2,5-disulfonamide, etc.

Examples of presently useful compounds of class (II) comprise the N,N'-dialkylbiphenyl- or terphenylsulfonamides, e.g., N,N'-dimethyl-, N,N'-diethyl- or N,N'-diamylbiphenyl-4,4'- (or 2,4-, or 2,3- or 2,2' or 3',3')-disulfonamide; N,N'-dibutyl or N,N'-dipropyl-4,4'-diisopropylbiphenyl-2,2'-disulfonamide, or N,N'-dimethyl-p-terphenyl-1,4'' disulfonamide.

Another group of the presently useful N,N'-dialkyl-arylenedisulfonamide comprises the N,N'-dialkylnaphthalenedisulfonamides and the nuclear alkyl derivatives thereof, e.g., N,N'-dimethylnaphthalene-1,8-disulfonamide or the N,N'-diethyl-1-butylnaphthalene-3,8-disulfonamide.

The fused ring arylene group may also be an aromatic hydrocarbon group such as fluorene, indene or acenaphthene, e.g., the presently useful disulfonamide may be N,N'-dimethylfluorene-2,7-disulfonamide; N,N'-diethylacenaphthene-1,2-disulfonamide; or N,N'-diisopropylindene-3,7-disulfonamide.

Examples of the class (III) compounds are N,N'-dimethyl or N,N'-diisopropylbibenzyl-2,2'-disulfonamide, or N,N'-diethyl or N,N'-dibutyl, or N,N'-dimethyl diphenylmethane-4,4'-disulfonamide.

The arylene radical of the useful sulfonamides may be substituted by one or more alkyl radicals as stated above, or it may be substituted by a cycloalkyl radical, so long as the total number of carbon atoms present in the hydrocarbon radical to which the two sulfonamide groups are attached is not greater than 18. Thus the N,N'-dialkyl-ar-cycloalkylbenzenedisulfonamides such as N,N'-dimethyl-4-cyclohexylbenzene-1,3-disulfonamide or N,N'-diethyl-4'-cyclohexylbiphenyl-2,4-disulfonamide may be employed.

Instead of the hydrocarbon disulfonamides disclosed above, also presently useful are the disulfonamides of the aromatic oxy compounds depicted above as classes (IV)–(VI), e.g., 4,4'oxybis(N-methylbenzenesulfonamide) of class (IV), p,p'(ethylenedioxy)bis(N-isopropylbenzenesulfonamide) of class (V) and the 4,4'-oxybis(N-methylethylenebenzenesulfonamide) of class (VI). One or more of the benzene rings of these oxy aromatic disulfonamides may be replaced by another aromatic structure, e.g., fluorene, biphenyl, or naphthalene, so long as the total number of carbon atoms in the entire disulfonamide molecule is not more than 18, in addition to the carbon content of the N,N'-substituents. Thus, there may be employed in the reaction with the dipropiolate the N,N'-diethyl-α-(4-sulfonamidophenoxy)naphthalene-β-sulfonamide, i.e., a compound wherein one of the benzene rings in the class (IV) disulfonamides is replaced by the naphthalene ring. Similarly, in the class (V) and (VI) compounds, one of the benzene rings may be substituted by a naphthalene ring so long as the carbon content of the radicals A or A' is limited to give a total carbon content in the disulfonamide which, not counting that of the N,N'-dialkyl radicals, is not more than 18. Other aromatic hydrocarbon radicals, e.g., the biphenyl, fluorene or acenaphthene rings may replace one of the benzene rings.

As indicated in the class (II) to (VI) formulas above, the sulfonamido groups need not be on the same aromatic nucleus. Thus, there may be used N,N'-dibutyl-2,3-biphenyldisulfonamide as representative of class (II), N,N'-dimethyl 3-benzyl-1,4-benzenedisulfonamide as representative of class (III), N,N'-dimethyl-4-phenoxy-1,2-benzenedisulfonamide as representative of class (IV), N,N'-dipropyl-4-(2-phenoxyethoxy)-2,3-benzenedisulfonamide as representative of class (V), and N,N'-diamyl-3-(benzyloxymethyl)-1,4-benzenedisulfonamide as representative of class (VI).

Reaction of the acetylenic diester with the disulfonamide is generally conducted in the presence of a basic catalyst and in the presence of an inert liquid diluent or solvent. Preferably, the basic catalyst is organic. This is particularly desirable when the reaction is effected in the presence of a diluent. Examples of presently useful basic catalysts are, e.g., the heterocyclic nitrogen bases such as N-methylmorpholine, pyridine, quinoline, N-ethylpiperidine, picoline, quinaldine, 4-methylpyrimidine, or N-phenylpyrazole; the tertiary amines such as triethylamine, triamylamine, tri-tert-butylamine, N,N-dimethylaniline and N-benzyl-N-methylaniline; alkylene polyamines such as propylene diamine, triethylenediamine or tetrapropylenetriamine; quaternary ammonium compounds such as benzyltrimethylammonium methoxide or tetrabutylammonium butoxide; alkali metal alkoxides such as sodium or potassium methoxide or propoxide, etc. Usually, compounds having tertiary nitrogen are most satisfactory; however, as will be seen hereinafter, the polyalkylene polyamines such as triethylenediamine are very good catalysts for the polymerization reaction. The use of a diluent or solvent in the reaction will depend upon the nature of the reactants as well as upon the reaction conditions which are employed. When using a liquid diester a diluent need not be used unless the ester and/or the disulfonamide are extremely reactive. In that case, the use of an inert diluent will serve to moderate the reaction. Since essentially all reactions of organic compounds are influenced with respect to relative rates and extent of reaction by structural variations in the reactants, in this case, too, adjustments of temperature and catalysis must be made to secure conrtol of reaction times and product molecular weights. The quantity of the catalyst to be used also depends upon the nature of the acetylenic ester and of the disulfonamide; obviously the more reactive reactants will require less catalyst than will the more sluggish reactants. Whether or not a diluent and the quantity thereof is used will likewise regulate catalyst quantity. Also variable is the temperature at which reaction is effected; for, here again must be taken into consideration the nature of the reactants, use of diluent and catalyst quantity. While some of the present addition polymerizations can be conducted at ordinary room temperature or even at decreased temperatures, say, −10° C. to 10° C., in other instances heating of the reaction mixture will be needed. All of these variables, i.e., catalyst quantity, use of diluent and temperature conditions can readily be arrived at by easy experimentation. Since reaction is evidenced by evolution of heat and a change in viscosity, whether or not one or both of such phenomena occur will be indicative of reaction. Very rapid reaction at room temperature, as evidenced by rapid temperature rise will show the need for a diluent, and/or lower temperature and/or less catalyst. Conversely, no reaction or only a very slow reaction at room temperature will indicate the use of more extreme conditions, i.e., extraneous heating and/or no diluent and/or more catalyst. Arrival at optimum reaction conditions is thus simply a matter of routine procedure by one skilled in the art. To assure complete reaction in experimental runs it is generally recommended that the reaction mixture be allowed to stand for some time after the primary, generally exothermic reaction has subsided. Completion of the reaction can then be ascertained by simply noting cessation in change of viscosity.

When the addition polymerization reaction has been effected in the absence of a solvent or diluent, generally no further treatment of the product is required previous to its use, say, as a plasticizer, molding resin, or impregnant. When the reaction is effected in the presence of a diluent which is a non-solvent for the polymer, the precipitated resinous product is simply filtered off, washed and dried. When the reaction is conducted in a liquid which is a solvent for the polysulfonamide, the latter is separated from the reaction mixture by mixing with a liquid which is a non-solvent for the polymer. The precipitate or coagulate thus formed consists essentially of the addition polymer. The coagulates are then filtered off and washed and dried to give the resinuous polysulfonamides. However, solutions of the polymer need not be coagulated to give useful products; for many purposes the solutions per se may be used directly, e.g., as bonding adhesives and as impregnating agents. The solutions may also be used for conversion of the soluble, linear polysulfonamide content thereof into insoluble, cross-linked resins.

To recapitulate. In the preparation of the present polysulfonamides, the acetylenic diester is reacted with the disulfonamide in the presence of a basic catalyst and in the presence or absence of an inert diluent or solvent at a temperature which may be as low as, say, −10° C. and as high as, say 125° C. and the resulting mixture is allowed to stand until a very high molecular weight addition polymer is achieved. The acetylenic ester and the disulfonamide are employed in substantially stoichiometric proportions in order to avoid need of separating unreacted material, and the addition polymerization is preferably conducted in an oxygen-free atmosphere, for example, nitrogen, carbon dioxide or other inert gaseous atmosphere. Depending upon the individual reactants and catalyst and upon whether or not a diluent is used, extraneous heating may or may not be employed; but when it is used, the mixture is heated up gradually, say, at a rate of 1 to 5° C. per minute to a temperature which may be up to 125° C. but is more generally from 79° C. to 90° C. Also, depending upon the nature of the individual reactants, the quantities thereof and the reaction conditions, completion of the reaction as noted by no further change in viscosity, is obtained within a time that will range from, say, a few minutes to several days. Whether or not a linear polysulfonamide is obtained and the molecular weight of the polymer will depend to some extent on the proportion of reactants employed. The high molecular weight, linear polymers are generally obtained when the disulfonamide and the acetylenic ester are used in substantially equimolar proportions. A substantial excess of the sulfonamide may result in cross-linking of the initially formed linear polymer by addition of the sulfonamide across the olefinic double bonds of the linear polymer.

Alternative procedures may involve the use of a mixture of two or more different acetylenic esters, for example, a mixture of the dipropiolate of ethylene glycol and the bis(phenylpropiolate) of 4,4'-isopropylidenediphenol. Likewise, there may be used a mixture of disulfonamides to obtain polymers having various linkages dispersed more or less randomly in the polymer chain.

The presently provided linear polysulfonamide-polyesters are transparent solids. They are readily compression molded with heating to give molded objects which are tough, transparent and of good dimensional stability. The polymers may also be cast into films from solutions thereof or fibers may be prepared therefrom by extruding through a suitable orifice into a precipitating bath. Solutions of the solid polymers or the viscous polymers which are obtainable under some conditions by incomplete polymerization are useful as impregnating agents and adhesives in the manufacture of laminates. The polymers are also advantageously employed in resinous base coatings, i.e., paints, varnishes, lacquers and enamels. Solutions of the linear polymers are also useful in the manufacture of tiles, linoleums, wallboards, etc. by mixing them with comminuted matter, such as ground cork, wood flour, asbestos, mineral fillers or the like and either completing the polymerization or evaporating the solvent or diluent. The presently provided polymers are likewise useful as potting compounds and sealants. An especially interesting utility of the present polymers, particularly of the gels, is in the formulation of solid or semi-solid propellant fuels for rockets and other self-guided missiles.

Compounds reactive under curing conditions with the presently provided linear polysulfonamide-polyesters to give tough, cross-linked resins are, for example, compounds containing a vinyl ($CH_2$:CH—) radical and copolymerizable with the linear polyesters such as styrene, vinyl acetate, vinyl chloride and methyl vinyl ketone; the alkylene cycloalkylene or arylene isocyanates or isothiocyanates such as ethylene or arylene isocyanates or isothiocyanates such as ethylene diisocyanate, trimethylene diisothiocyanate, cyclohexylene-1,2-diisocyanate or 1,4-diphenylenediisocyanate; polyfunctional compounds such as polyhydroxy, polycarboxy, or polyamine acid compounds, e.g., propylene glycol, maleic diethylenetriamine or tricarballylic acid; and alkenyl esters of $\alpha,\beta$-unsaturated dicarboxy acids such as allyl fumarate or maleate.

The cross-linked polymers obtained by heating the present linear polysulfonamide-polyesters with a monovinyl aromatic compound or mixtures of such compounds under curing conditions, e.g., in the presence of a catalyst of polymerization, are of exceptional interest in that they comprise valuable resinous materials of high utility in the preparation of moldings, castings, laminates and fibers. Presently useful polymerization catalysts are, e.g., peroxidic compounds such as benzoyl peroxide, tert-butyl hydroperoxide, cumene hydroperoxide, or potassium persulfate or azo compounds such as $\alpha,\alpha'$-azobisiso-butyronitrile, etc. Moldings and castings formed from such cross-linked polymers are transparent, substantially colorless, tough products which are characterized by good dimensional stability and resistance to heat and moisture. Monovinyl aromatic compounds useful for the preparation of the cross-linked polyesters are compounds in which one vinyl group is attached to a carbon atom of a benzene, biphenyl, naphthalene, fluorene or acenaphthene ring structure. The ring may contain other substituents such as chlorine, fluorine, alkoxy, alkyl, hydroxy, trichloromethyl, trifluoromethyl or acetyl. The vinyl group may or may not be substituted. As illustrative of compounds included within the scope of monovinyl aromatic compounds may be mentioned styrene, $\alpha$-methylstyrene, 3,4-dichlorostyrene, 4-fluorostyrene, $\alpha$-chlorostyrene, 4-vinyltoluene, 3-(trifluoromethyl)styrene, 4-vinylanisole, 4-vinylacetophenone, $\alpha$-vinylnaphthalene, 4-vinylbiphenyl, 3-vinylfluoroene, 2-vinylacenaphthene, etc.

The invention is further illustrated by, but not limited to, the following examples:

*Example 1*

To a mixture consisting of 2.0821 g. (0.0100 mole) of the dipropiolate of 2,2-dimethyl-1,3-propanediol, 3.5640 g. (0.0100 mole) of 4,4'-oxybis[N-methylbenzenesulfonamide] and 7.9 ml. of dioxane there was added 0.1 ml. of a catalyst solution which had been prepared by diluting 0.2243 g. of triethylenediamine to 10 ml. with dioxane. A mild exothermic reaction occurred within a minute and at the end of 20 minutes the reaction mixture was noticeably becoming viscous. The reaction mixture was then allowed to stand at room temperature for 40 hours, at the end of which time it was a clear, colorless gel. After standing for an additional 33 hours, the gel was firm and friable. It was broken up with 150 ml. of methanol, and the whole was allowed to stand for 18 hours. After filtering, extracting the solids with water for an hour, the solids were dried at 115° C. for 5 hours. There was thus obtained the almost colorless, solid, linear polyester polysulfonamide. An 0.2% cyclohexanone solution of the polymer had a specific viscosity of 0.133 at 25° C. The polymer was molded at 165° C. to give a clear, transparent molded sheet of a very light amber color. Clash-Berg evaluation of a molded specimen of the polymer gave $T_f$ 86° C., $T_{2000}$ 104° C. and 25° C. modulus of ca. 500,000 p.s.i. The molded polymer was found to have a tensile strength of 4571 p.s.i. at yield and a 4% elongation at break.

*Example 2*

To a mixture consisting of 4.1641 g. (0.02 mole) of the dipropiolate of 2,2-dimethyl-1,3-propanediol, 5.5668 g. (0.02 mole) of N,N'-dimethyl-2,4-toluenedisulfonamide and 12 ml. of dioxane there were added 4 drops (0.1 g.) of N-methylmorpholine. The whole was then placed in an 80° C. oven. After 35 minutes, the reaction mixture was a clear, light amber, rather viscous solution. After a total of 17 hours at 80° C. the mixture was still clear and amber, but it had become very viscous. It was then diluted with 20 ml. of acetone and coagulated in 300 ml. of methanol. After digesting and washing the coagulate first with methanol and then with water, it was dried overnight at 105° C. to give 9.11 g. (93.7% theoretical yield) of cream-colored grains of the polysulfonamido polyester. An 0.2% cyclohexanone solution of the polymer had a specific viscosity of 0.078 at 25° C. The polymer was sheet molded at 170° C. to give a light amber, clear molded sheet. Clash-Berg evaluation gave $T_f$ 74° C., $T_{2000}$ 90° C. and a 25° modulus of 500,000.

What we claim is:

1. A resinous composition comprising a polymer having the repeating unit

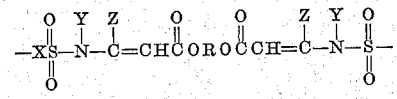

wherein X is selected from the class consisting of hydrocarbon, hydrocarbonoxyhydrocarbon and hydrocarbonoxyhydrocarbonoxyhydrocarbon radicals which are free of aliphatic unsaturation, contain from 6 to 18 carbon atoms, and is linked through aromatic carbon thereof to the remainder of the molecule, Y is an alkyl radical of from 1 to 5 carbon atoms, Z is selected from the class consisting of hydrogen, alkyl radicals of from 1 to 5 carbon atoms and aryl radicals of 6 to 10 carbon atoms and R is selected from the class consisting of hydrocarbon radicals and halohydrocarbon radicals of from 2 to 18 carbon atoms and is linked through diverse carbon atoms thereof to the remainder of the molecule of which it forms a part.

2. The resinous composition of claim 1, further limited in that X is hydrocarbon, Z is hydrogen, and R is hydrocarbon.

3. The resinous composition of claim 1, further limited in that X is hydrocarbon, Z is hydrogen, and R is alkylene.

4. The resinous composition of claim 1, further limited in that X is hydrocarbon, Z is hydrogen and R is arylene.

5. The resinous composition of claim 1, further limited in that X is hydrocarbonoxyhydrocarbon, Z is hydrogen and R is hydrocarbon.

6. The resinous composition of claim 1, further limited in that X is phenylene carrying a methyl radical as a substituent, Z is hydrogen and R is hydrocarbon.

7. A resinous composition comprising a polymer having the repeating unit

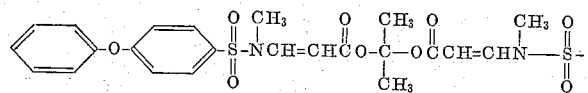

8. A resinous composition comprising a polymer having the repeating unit

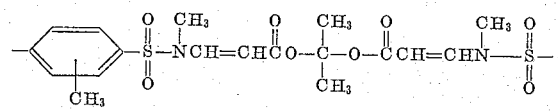

9. The method of preparing a resinous composition which comprises contacting in the presence of an organic basic catalyst and an inert diluent an acetylenic ester of the formula

where Z is selected from the class consisting of hydrogen, alkyl radicals of from 1 to 5 carbon atoms and aryl radicals of 6 to 10 carbon atoms and R is selected from the class consisting of bivalent hydrocarbon radicals and bivalent halohydrocarbon radicals of from 2 to 18 carbon atoms and is linked through diverse carbon atoms thereof to the remainder of the molecule of which it forms a part, with a compound of the formula

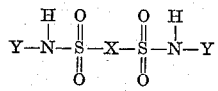

where Y is an alkyl radical of from 1 to 5 carbon atoms and X is selected from the class consisting of hydrocarbon, hydrocarbonoxyhydrocarbon and hydrocarbonoxyhydrocarbonoxyhydrocarbon radicals which are free of aliphatic unsaturation and which contain from 6 to 18 carbon atoms and which is linked through aromatic carbon atoms thereof to the remainder of the molecule.

10. The method of preparing a resinous composition which comprises contacting in the presence of an organic basic catalyst and an inert diluent the dipropiolate of a hydrocarbon diol wherein the two hydroxy radicals are attached to diverse carbon atoms of a hydrocarbon radical having from 2 to 18 carbon atoms, with an N,N'-dialkyl hydrocarbon disulfonamide wherein each of said alkyl radicals has from 1 to 5 carbon atoms, the hydrocarbon radical has from 6 to 18 carbon atoms and each of the sulfonamide radicals is attached through the sulfur atom thereof to an aromatic carbon atom of said hydrocarbon radical.

11. The method of preparing a resinous composition which comprises contacting in the presence of an organic basic catalyst and an inert diluent the dipropiolate of a hydrocarbon glycol having from 2 to 18 carbon atoms in the hydrocarbon radical with an N,N'-dialkyl hydrocarbondisulfonamide wherein each of said alkyl radicals has from 1 to 5 carbon atoms, the hydrocarbon radical has from 6 to 18 carbon atoms and each of the sulfonamide radicals is attached through the sulfur atom thereof to an aromatic carbon atom of said hydrocarbon radical.

12. The method of preparing a resinous composition which comprises contacting in the presence of an organic basic catalyst and an inert diluent the dipropiolate of an alkylene glycol having from 2 to 18 carbon atoms in the alkylene radical with an N,N-dialkyl hydrocarbon disulfonamide wherein each of said alkyl radicals has from 1 to 5 carbon atoms, the hydrocarbon radical has from 6 to 18 carbon atoms and each of the sulfonamide radicals is attached through the sulfur atom thereof to an aromatic carbon atom of said hydrocarbon radical.

13. The method of preparing a resinous composition which comprises contacting in the presence of an organic basic catalyst and an inert diluent the dipropiolate of an arylene diol of from 6 to 18 carbon atoms with an N,N'-dialkyl hydrocarbondisulfonamide wherein each of said alkyl radicals has from 1 to 5 carbon atoms, the hydrocarbon radical has from 6 to 18 carbon atoms and each of the sulfonamide radicals is attached through the sulfur atom thereof to an aromatic carbon atom of said hydrocarbon radical.

14. The method of preparing a resinous composition which comprises contacting in the presence of an organic basic catalyst and an inert diluent the dipropiolate of a hydrocarbon diol wherein the two hydroxy radicals are attached to diverse carbon atoms of a hydrocarbon radical having from 2 to 18 carbon atoms with an N,N'-dialkyl hydrocarbonoxyhydrocarbondisulfonamide wherein each of the alkyl radicals has from 1 to 5 carbon atoms, the remainder of the molecule has from 6 to 18 atoms, and each of the sulfonamide radicals is attached through the sulfur atom thereof to an aromatic carbon atom of a hydrocarbon radical.

15. The method of preparing a resinous composition which comprises contacting in the presence of an organic basic catalyst and an inert diluent the dipropiolate of a hydrocarbon diol wherein the two hydroxy radicals are attached to diverse carbon atoms of a hydrocarbon radical having from 2 to 18 carbon atoms with an oxybis(N-alkylarylsulfonamide) wherein each of the alkyl radicals has from 1 to 5 carbon atoms and the remainder of the molecule has from 6 to 18 carbon atoms.

16. The method of preparing a resinous composition which comprises contacting in the presence of an organic basic catalyst and an inert diluent the dipropiolate of 2,2-dimethyl-1,3-propanediol with 4,4-oxybis(N-methylbenzenesulfonamide).

17. The method of preparing a resinous composition which comprises contacting in the presence of an organic basic catalyst and an inert diluent the dipropiolate of 2,2-dimethyl-1,3-propanediol with N,N'-dimethyl-2,4-toluenedisulfonamide.

References Cited in the file of this patent
UNITED STATES PATENTS
2,808,394    Speck _____ Oct. 1, 1957